United States Patent
Wu et al.

(10) Patent No.: US 10,326,142 B2
(45) Date of Patent: Jun. 18, 2019

(54) POSITIVE ELECTRODE INCLUDING DISCRETE ALUMINUM OXIDE NANOMATERIALS AND METHOD FOR FORMING ALUMINUM OXIDE NANOMATERIALS

(71) Applicant: GM GLOBAL TECHNOLOGY OPERATIONS LLC, Detroit, MI (US)

(72) Inventors: Yan Wu, Troy, MI (US); Zhongyi Liu, Troy, MI (US); Xiaosong Huang, Novi, MI (US); Xingyi Yang, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 209 days.

(21) Appl. No.: 14/855,142

(22) Filed: Sep. 15, 2015

(65) Prior Publication Data
US 2017/0077520 A1    Mar. 16, 2017

(51) Int. Cl.
*H01M 4/62* (2006.01)
*H01M 4/485* (2010.01)
(Continued)

(52) U.S. Cl.
CPC .............. *H01M 4/628* (2013.01); *C01F 7/34* (2013.01); *C01F 7/441* (2013.01);
(Continued)

(58) Field of Classification Search
CPC .... H01M 4/04; H01M 4/0404; H01M 4/0416; H01M 4/0471; H01M 4/485; H01M 4/623; H01M 4/624; C01F 7/02
See application file for complete search history.

(56) References Cited

U.S. PATENT DOCUMENTS 3,258,360 A * 6/1966 Kordesch .................. C01B 5/00
                                                                    429/57
4,053,571 A * 10/1977 Ebner .................. C01G 28/004
                                                                    423/464
(Continued)

FOREIGN PATENT DOCUMENTS

CN    102522562 A    6/2012
CN    102544439 A    7/2012
(Continued)

OTHER PUBLICATIONS

Huang et al., "Facile fabrication of urchin-like hollow boehmite and alumina microspheres with a hierarchical structure via Triton X-100 assisted hydrothermal synthesis", Royal Society of Chemistry, 17, P1318-1325, Dec. 16, 2014.*
(Continued)

*Primary Examiner* — Kenneth J Douyette
(74) *Attorney, Agent, or Firm* — Harness, Dickey & Pierce, P.L.C.

(57) ABSTRACT

A positive electrode includes a lithium-based active material, a binder, a conductive filler, and discrete aluminum oxide nanomaterials. The aluminum oxide nanomaterials are mixed, as an additive, throughout the positive electrode with the lithium-based active material, the binder, and the conductive filler. The positive electrode with the discrete aluminum oxide nanomaterials may be incorporated into a lithium ion battery. The aluminum oxide nanomaterials may be formed by the following method. A solution is formed by mixing an aluminum oxide precursor and an acid. A carbon material is added to the solution, thereby forming an aqueous mixture having the carbon material therein. Hydrothermal synthesis is performed using the aqueous mixture, and precursor nanostructures are grown on the carbon material. The precursor nanostructures on the carbon material are
(Continued)

US 10,326,142 B2

Page 2 annealed so that the carbon material is removed and aluminum oxide nanomaterials are formed.

16 Claims, 5 Drawing Sheets (51) Int. Cl.
  H01M 4/04 (2006.01)
  C01F 7/34 (2006.01)
  C01F 7/44 (2006.01)
  H01M 4/13 (2010.01)
  H01M 10/42 (2006.01)
  H01M 10/0525 (2010.01)
  H01M 4/02 (2006.01)
  H01M 4/131 (2010.01)
  H01M 4/1391 (2010.01)

(52) U.S. Cl.
  CPC ........... *H01M 4/0404* (2013.01); *H01M 4/13* (2013.01); *H01M 10/4235* (2013.01); *C01P 2004/04* (2013.01); *C01P 2004/13* (2013.01); *C01P 2004/16* (2013.01); *C01P 2006/12* (2013.01); *H01M 4/131* (2013.01); *H01M 4/1391* (2013.01); *H01M 4/621* (2013.01); *H01M 4/625* (2013.01); *H01M 10/0525* (2013.01); *H01M 2004/028* (2013.01)

(56) References Cited

U.S. PATENT DOCUMENTS

| | | | | |
|---|---|---|---|---|
| 5,474,858 | A | * | 12/1995 | Merritt ................. H01M 10/05 429/114 |
| 7,018,607 | B2 | | 3/2006 | Nazri et al. |
| 8,148,455 | B2 | | 4/2012 | Posudievsky et al. |
| 8,535,832 | B2 | | 9/2013 | Karthikeyan et al. |
| 9,023,520 | B2 | | 5/2015 | Halalay et al. |
| 9,281,515 | B2 | | 3/2016 | Nazri |
| 9,437,863 | B2 | | 9/2016 | Xiao et al. |
| 9,786,906 | B2 | | 10/2017 | Yang et al. |
| 2003/0129487 | A1 | * | 7/2003 | Inoue ................. H01M 2/0262 429/176 |
| 2004/0101753 | A1 | * | 5/2004 | Hwang ................. H01M 4/366 429/218.1 |
| 2005/0130042 | A1 | | 6/2005 | Liu et al. |
| 2006/0228281 | A1 | * | 10/2006 | Stroder ................. B01D 53/12 423/212 |
| 2007/0264571 | A1 | * | 11/2007 | Ryu ................. H01M 4/62 429/218.1 |
| 2010/0136429 | A1 | * | 6/2010 | Muraoka ................. H01M 4/13 429/223 |
| 2011/0177398 | A1 | * | 7/2011 | Affinito ................. H01M 4/134 429/325 |
| 2012/0070741 | A1 | * | 3/2012 | Liu ................. B82Y 30/00 429/219 |
| 2012/0156558 | A1 | | 6/2012 | Sawaki et al. |
| 2012/0227252 | A1 | | 9/2012 | Nazri |
| 2012/0264017 | A1 | | 10/2012 | Nazri et al. |
| 2012/0305069 | A1 | * | 12/2012 | Kim ................. B82Y 30/00 136/256 |
| 2013/0071742 | A1 | | 3/2013 | Halalay et al. |
| 2013/0224591 | A1 | | 8/2013 | Kishimi et al. |
| 2014/0332392 | A1 | * | 11/2014 | Afzulpurkar ........ C25D 11/045 205/50 |
| 2015/0030922 | A1 | * | 1/2015 | Kobayashi ............ H01M 4/622 429/217 |

FOREIGN PATENT DOCUMENTS

| | | | | |
|---|---|---|---|---|
| CN | 103380517 | A | | 10/2013 |
| CN | 103633328 | A | | 3/2014 |
| CN | 106532054 | A | | 3/2017 |
| DE | 102016116791 | A1 | | 3/2017 |
| WO | WO-9933131 | A1 | * | 7/1999 .......... H01M 4/0485 |
| WO | WO-2012054767 | A2 | | 4/2012 |

OTHER PUBLICATIONS

Abdullah et al., "Single step hydrothermal synthesis of 3D urchin like structures of AACH and aluminum oxide with thin nano-spikes", Ceramics International, vol. 38, Issue 5, P3741-3745, Jul. 2012.*

First Office Action for Chinese Patent Application No. 201610804906.8 dated Aug. 15, 2018 and correspondence dated Aug. 17, 2018 from China Patent Agent (H.K.) Ltd. summarizing contents, 12 pages.

Second Office Action for Chinese Patent Application No. 201610804906.8 dated Mar. 18, 2019 and correspondence dated Mar. 20, 2019 from China Patent Agent (H.K.) Ltd. summarizing contents, 10 pages.

* cited by examiner

POSITIVE ELECTRODE INCLUDING DISCRETE ALUMINUM OXIDE NANOMATERIALS AND METHOD FOR FORMING ALUMINUM OXIDE NANOMATERIALS

BACKGROUND

Secondary, or rechargeable, lithium ion batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

In an example of a method disclosed herein, a solution is formed by mixing an aluminum oxide precursor and an acid. A carbon material is added to the solution to form an aqueous mixture having the carbon material therein. Hydrothermal synthesis is performed using the aqueous mixture, and precursor nanostructures are grown on the carbon material. The precursor nanostructures on the carbon material are annealed so that the carbon material is removed and aluminum oxide nanomaterials are formed.

Examples of the aluminum oxide nanomaterials may be used as an additive in a positive electrode of a lithium ion battery. An example of the positive electrode includes a lithium-based active material, a binder, a conductive filler, and discrete aluminum oxide nanomaterials. The aluminum oxide nanomaterials are mixed, as an additive, throughout the positive electrode with the lithium-based active material, the binder, and the conductive filler.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium ion batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted (e.g., intercalated, alloyed, etc.) into the negative electrode, and during discharging, lithium ions are extracted from the negative electrode. Each of the electrodes is also associated with respective current collectors, which are connected by an interruptible external circuit that allows an electric current to pass between the negative and positive electrodes.

In lithium ion batteries, residual water contaminate in the electrolyte can react with lithium salts, such as lithium hexafluorophosphate ($LiPF_6$) to generate hydrofluoric acid (HF). HF can react with both active and passive components of the battery, which may limit the cycle life of the battery. Mitigation of HF generation is helpful for creating lithium ion batteries with long cycle life. Aluminum oxide may mitigate HF generation by acting as an HF scavenger. Aluminum oxide may scavenge HF according to the following reaction (I):

$$Al_2O_3 + 6HF \rightarrow 2AlF_3 + 3H_2O \quad (I)$$

in which aluminum oxide may react with HF to produce aluminum fluoride ($AlF_3$) and water. It is believed that the $AlF_3$ product may also contribute to the stability of a solid-electrolyte interphase (SEI) that is formed.

In the positive electrode disclosed herein, discrete aluminum oxide nanomaterials are added as an additive. As used herein, the term "discrete" means that the nanomaterials are distinct structures, which are not embedded in or coated on the active material, the binder, the conductive filler, or other aluminum oxide nanomaterials. The additive is mixed throughout the positive electrode with the active material, binder, and conductive filler. The discrete aluminum oxide nanomaterials can improve the cycle life of lithium ion batteries, at least in part by acting as an HF scavenger. By scavenging HF, the discrete aluminum oxide nanomaterials can mitigate cathode/positive electrode transition metal (e.g., manganese, nickel, and cobalt) dissolution, which suppresses active material loss. Additionally, the reduced amount of dissolved transition metal ions that do migrate to the anode/negative electrode may be reduced at the anode into pure metal nanoparticles. The pure metal nanoparticles may catalyze the formation of solid-electrolyte interphase (SEI) at the anode.

The aluminum oxide nanomaterials disclosed herein may include a plurality of nanostructures that extend radially and outward from a center so that they resemble a sea urchin. The nanostructures may be connected to one another at or near the center. Each nanostructure may decrease in diameter along the length of the nanostructure away from the center. Small spaces (i.e., interspaces) may separate one nanostructure from another nanostructure in the assembly.

Referring now to FIGS. 1A-1D, an example of the method for forming aluminum oxide nanomaterials will be discussed. In an example, the method involves, in part, hydrothermal synthesis to form the aluminum oxide nanomaterials.

Figure 1A:
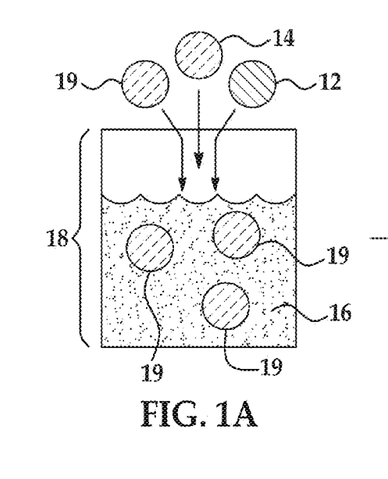
FIGS. 1A-1D are schematic and partially cross-sectional diagrams which together illustrate several examples of the method for forming an example of the aluminum oxide nanomaterials disclosed herein.

Turning to FIG. 1A, an aqueous mixture 16 is formed by mixing deionized water, an $Al_2O_3$ precursor 12, an acid 14, and a carbon material 19 in a container 18. The $Al_2O_3$ precursor 12 may be aluminum chloride ($AlCl_3$) or aluminum isopropoxide ($Al(O-i-Pr)_3$). In an example, about 12 g of the $Al_2O_3$ precursor 12 may be added for about 60 mL of aqueous mixture 16. After the $Al_2O_3$ precursor 12 is added to the deionized water in the container 18, the $Al_2O_3$ precursor 12 may be thoroughly dissolved by stirring. The components may be mixed using a magnetic stir bar, a stirring rod by hand, or any other suitable means known to a skilled artisan. For example, the aqueous mixture 16 may be mixed for a time ranging from about 5 minutes to about 2 hours. In an example, the aqueous mixture 16 is mixed for about 30 minutes.

The acid 14 may be hydrochloric acid (HCl) (e.g., 1 M HCl), $H_2SO_4$, $HNO_3$, $H_2PO_4$, or any other suitable acid. The acid 14 is added to the aqueous mixture 16 until the mixture 16 obtains a desired pH value. The pH value of the mixture 16 after the acid 14 has been added may range from about 1 to about 3.

The carbon material 19 may be suspended or dispersed in the deionized water. Any carbon material 19 that can provide heterogeneous nucleation sites for $Al_2O_3$ and is inert during hydrothermal synthesis may be used. In an example, the carbon material 19 is easily dispersed in the aqueous mixture 16, has a large surface area with many defects to act as heterogeneous nucleation sites, and is easily removed (e.g., by thermal oxidation) after the hydrothermal synthesis. In an example, the carbon material 19 is hollow carbon or graphite. Hollow carbon can be prepared by thermally oxidizing carbon black. Some examples of suitable commercially available carbon black particles include VULCAN® XC72 (Cabot Corp.), KETJENBLACK® (Akzo Nobel), and Black Pearl (BP2000) (Cabot Corp.). In an example, for every 1 gram of the $Al_2O_3$ precursor 12 that is included in the aqueous mixture 16, from about 0.8 mg to about 2.5 mg of the carbon material 19 may be added.

Figure 1B:
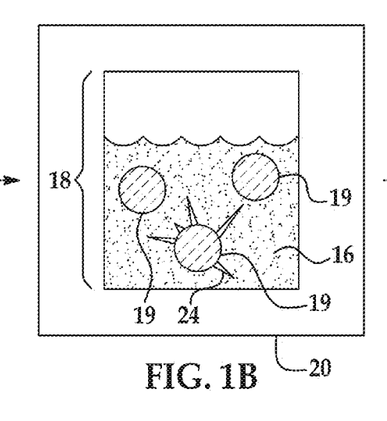
Figure 1C:
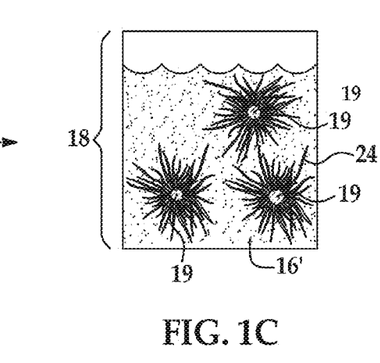

The carbon material 19 provides heterogeneous nucleation sites during hydrothermal synthesis of the aqueous mixture 16, and thus facilitates the nucleation and growth process of a $Al_2O_3$ precursor nanostructure 24 (see FIG. 1C). By providing heterogeneous nucleation sites during hydrothermal synthesis, it is believed that the carbon material 19 provides a center structure from which the $Al_2O_3$ precursor nanostructure 24 can grow. These $Al_2O_3$ precursor nanostructures 24 grow radially and outward form the center. As such, the carbon material 19 enables the ultimately formed aluminum oxide nanomaterials 26 (see FIG. 1D) to have a structure that resembles a sea urchin, i.e., the individual nanostructures extend radially and outward from the center. Additionally, it is believed that the carbon material 19 increases the yield of the $Al_2O_3$ precursor nanostructures 24, and thus ultimately the aluminum oxide nanomaterials 26. The edges and/or cavities of the carbon material 19 provide the nucleation sites for $Al_2O_3$ precursor nanostructure 24 growth.

Turning now to FIG. 1B, after mixing the aqueous mixture 16, the aqueous mixture 16 may be added to a closed system 20. In an example, the closed system 20 is an autoclave. Some examples of the autoclave include a polytetrafluoroethylene-lined (e.g., TEFLON®-lined) or copper-lined stainless steel autoclave. A TEFLON®-lined autoclave is used at temperatures below 200° C. A copper-lined autoclave is used at temperatures at or above 200° C.

The hydrothermal synthesis is performed in the closed system 20, as shown in FIG. 1B. More particularly, within the closed system 20, the aqueous mixture 16 is subjected to heat and vapor pressure for a certain amount of time. The temperature of the heat ranges from about 150° C. to about 200° C. The vapor pressure ranges from about 700 psi to about 1380 psi. The heat and vapor pressure are applied for a time ranging from about 24 hours to about 48 hours. In an example, the closed system 20 may be raised to a temperature of about 200° C. for about 24 hours. It is believed the vapor pressure may be around 1000 psi in the closed system 20.

As noted above, the aqueous mixture 16 that is exposed to hydrothermal synthesis has therein a water soluble $Al_2O_3$ precursor 12. The application of heat and vapor pressure in the closed system 20 forms a $Al_2O_3$ precursor nanostructure 24 from the water soluble $Al_2O_3$ precursor 12. In an example, the $Al_2O_3$ precursor nanostructure 24 is a AlOOH petal or spike attached to the carbon material 19. Several $Al_2O_3$ precursor nanostructures 24 are attached to the carbon material 19, and together the $Al_2O_3$ precursor nanostructures 24 form a sea urchin-like nanomaterial. This sea urchin-like nanomaterial has many solid $Al_2O_3$ precursor nanostructures 24 grown radially and outward from the nucleation sites of the carbon material 19.

As shown in FIG. 1C, after hydrothermal synthesis, several $Al_2O_3$ precursor nanostructures 24 are grown on a single particle of the carbon material 19. It is believed that at least some of the $Al_2O_3$ precursor nanostructures 24 that are formed during hydrothermal synthesis are attached to the hollow carbon 19, as shown in FIG. 1C. Several $Al_2O_3$ precursor nanostructures 24 may even grow from the same preferential site, and thus may be attached to other $Al_2O_3$ precursor nanostructures 24. In these examples, as the $Al_2O_3$ precursor nanostructures 24 grow, the $Al_2O_3$ precursor nanostructures 24 remain attached to the carbon material 19 surfaces. The $Al_2O_3$ precursor nanostructures 24 continue to grow into the sea-urchin like aluminum oxide nanomaterials 26 (shown in FIG. 1D).

In one specific example of the method, $AlCl_3$ is the $Al_2O_3$ precursor 12 and HCl is the acid 14. $AlCl_3$ and 1 M HCl are added to deionized water to form an aqueous solution (not shown). In this example, 1 M HlCl is added until the solution has a pH value of 1.5. In this example, hollow carbon is also added, as the carbon material 19, to the solution, thereby forming the aqueous mixture 16. The carbon material 19 may be added before the addition of, or after the addition of, or simultaneously with the $Al_2O_3$ precursor 12 and/or the acid 14. It is to be understood that since the hollow carbon 19 does not react with the $Al_2O_3$ precursor 12 or the acid 14, it may be added to the other components at any time during the formation of the aqueous mixture 16. Since the $Al_2O_3$ precursor 12 and the acid 14 will dissolve in the deionized water, a solution may be formed prior to the addition of the carbon material 19 and the formation of the aqueous mixture 16. In the previously mentioned specific example, once the AlCl$_3$ has dissolved, the solution has a pH of 1.5, and the hollow carbon is added to form the aqueous mixture 16, the aqueous mixture 16 is placed in the closed system 20, such as an autoclave. Heat and vapor pressure are applied to the closed system 20 to cause the formation of the sea urchin-like Al$_2$O$_3$ precursor nanostructures 24 as previously described. In this example, AlOOH is the Al$_2$O$_3$ precursor nanostructure 24 that is formed.

After hydrothermal synthesis, it is to be understood that the aqueous mixture 16 has been altered (denoted by reference numeral 16' in FIG. 1C), and at least includes the Al$_2$O$_3$ precursor nanostructure 24, which has formed the sea urchin-like morphology as previously described. At least some deionized water is present in the aqueous mixture 16'. In some instances, other ions, such as Cl$^-$, may also be present at levels that do not affect the Al$_2$O$_3$ precursor nanostructures 24.

After hydrothermal synthesis, the Al$_2$O$_3$ precursor nanostructures 24 may then be removed from the aqueous mixture 16' using any suitable separation technique. For example, the Al$_2$O$_3$ precursor nanostructures 24 may be removed by vacuum filtration, centrifugal force, or any other suitable means. The Al$_2$O$_3$ precursor nanostructures 24 may be washed multiple times with deionized water during and/or after the separation of the Al$_2$O$_3$ precursor nanostructures 24 from the aqueous mixture 16'. It may be desirable to wash the Al$_2$O$_3$ precursor nanostructures 24 with deionized water before they are used in the annealing process.

After the Al$_2$O$_3$ precursor nanostructures 24 are separated from the aqueous mixture 16' and washed, the Al$_2$O$_3$ precursor nanostructures 24 may be dried at a temperature ranging from about 60° C. to about 80° C. for a time ranging from about 12 to about 24 hours.

The dried Al$_2$O$_3$ precursor nanostructures 24 may then undergo different examples of heat treatments to form aluminum oxide nanomaterials 26. In an example, a heat treatment is an annealing process (i.e., heating followed by slow furnace cooling) that is performed in air or another oxygen-containing environment. The heat treatment may be applied for a time ranging from about 3 hours to about 8 hours at a temperature ranging from about 400° C. to about 800° C. In an example, the heat treatment is applied at 550° C. for about 5 hours. During the heat treatment, the aluminum oxide nanomaterials 26 are formed. In particular, the air acts as an oxidizing environment for the Al$_2$O$_3$ precursor nanostructures 24, and thus forms the aluminum oxide nanomaterials 26. In addition, during the heat treatment, the carbon material 19 is burned off, leaving the aluminum oxide nanomaterials 26 in a sea-urchin like configuration/morphology (see FIGS. 4 and 5).

In an example, during the heat treatment, the following reactions (II, III) occur between hollow carbon 19 and Al$_2$O$_3$ precursor nanostructures 24 to form the aluminum oxide nanomaterials 26:

$$2\gamma\text{-AlOOH} \rightarrow \gamma\text{-Al}_2\text{O}_3 + \text{H}_2\text{O} \qquad (II)$$

$$C + O_2(\text{from air}) \rightarrow CO_2 \uparrow \qquad (III)$$

Al$_2$O$_3$ precursor nanostructures 24 may be oxidized to form Al$_2$O$_3$ (reaction I). The hollow carbon burns off, as shown in reaction (II).

Figure 4:
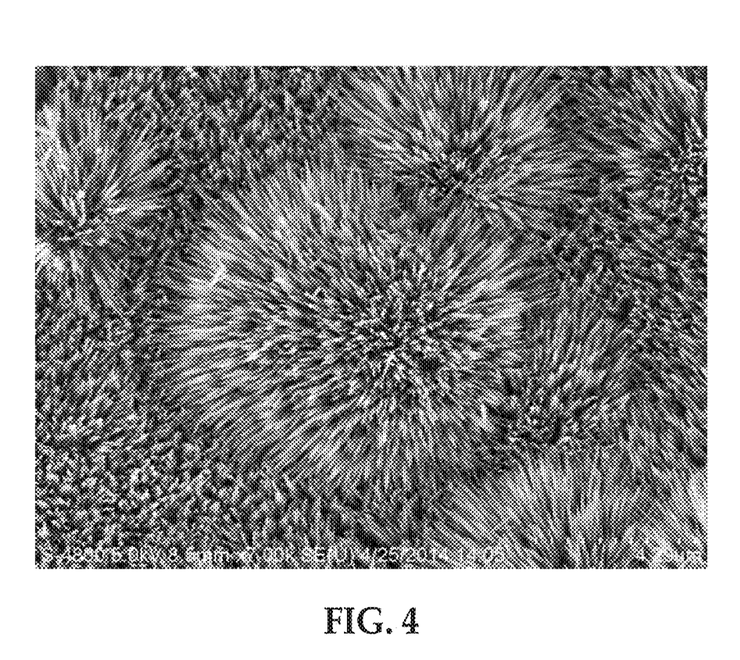
FIG. 4 is a scanning electron microscope ("SEM") image, using a scalar bar of 4.29 μm, of examples of the aluminum oxide nanomaterials formed from an example of the method disclosed herein.
Figure 5:
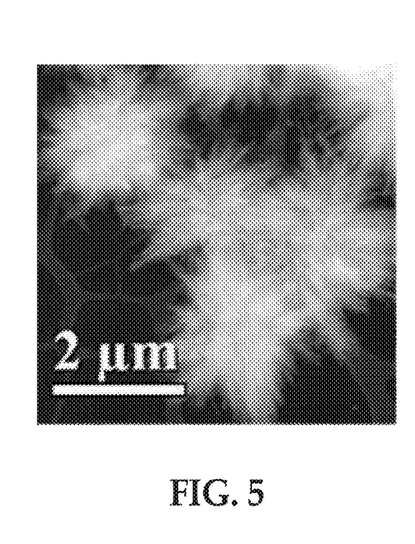
FIG. 5 is a transmission electron microscope ("TEM") image, using a scalar bar of 2 μm, of examples of the aluminum oxide nanomaterials formed from an example of the method disclosed herein.

Examples of the morphologies of the final aluminum oxide nanomaterials 26 are shown in FIGS. 4 and 5. A description of how these nanomaterials were formed is set forth in the examples section.

Figure 1D:
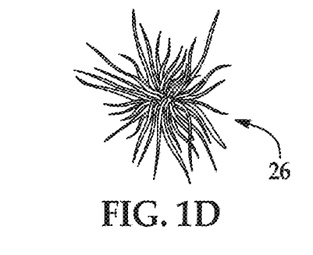

FIG. 1D schematically and respectively illustrates one aluminum oxide nanomaterial 26. Each of the nanostructures extending radially and outward from the center has a diameter ranging from about 10 nm to about 200 nm. The length of each of the nanostructures ranges from about 80 nm to about 3 microns. The diameter of the nanostructures may decrease along its length so that the nanostructure ends in a point, or has a spiked structure. The aluminum oxide nanomaterials 26 have a larger surface when compared to a metal oxide nanoparticle (which may be considered to be zero-dimensional because it is essentially a point) or a metal oxide nanorod (which may be considered to be one-dimensional because it is essentially a line). In an example, the surface area of each of the aluminum oxide nanomaterials 26 is at least about 150 m$^2$/g. In comparison, nanoparticles generally have a surface area ranging from greater than 0 m$^2$/g to about 100 m$^2$/g, and nanorods generally have a surface area ranging from about 115 m$^2$/g to about 150 m$^2$/g. The greater surface area of the aluminum oxide nanomaterials 26 improves their ability to mitigate HF formation. The aluminum oxide nanomaterials 26 may physically or chemically absorb the HF. The greater surface area of the aluminum oxide nanomaterials 26 provides the aluminum oxide nanomaterials 26 with more absorbing sites and thus allows for better reduction of HF in the electrolyte.

After obtaining the aluminum oxide nanomaterials 26, the aluminum oxide nanomaterials 26 may be added, as an additive, to a positive electrode composition of a lithium ion battery. In an example, the discrete aluminum oxide nanomaterials 26 are added to the positive electrode composition. In another example, the aluminum oxide nanomaterials 26 are added to the positive electrode composition together with nanomaterials 26', which are prepared by breaking off (either intentionally or during the formation of the positive electrode composition) some of the nanostructures extending radially and outward from the center of the nanomaterials 26. The broken off nanostructures 26' tend to lay down laterally and disperse substantially uniformly throughout the electrode composition. The positive electrode composition includes at least an active material. This is described in further detail in reference to FIG. 2.

Figure 2:
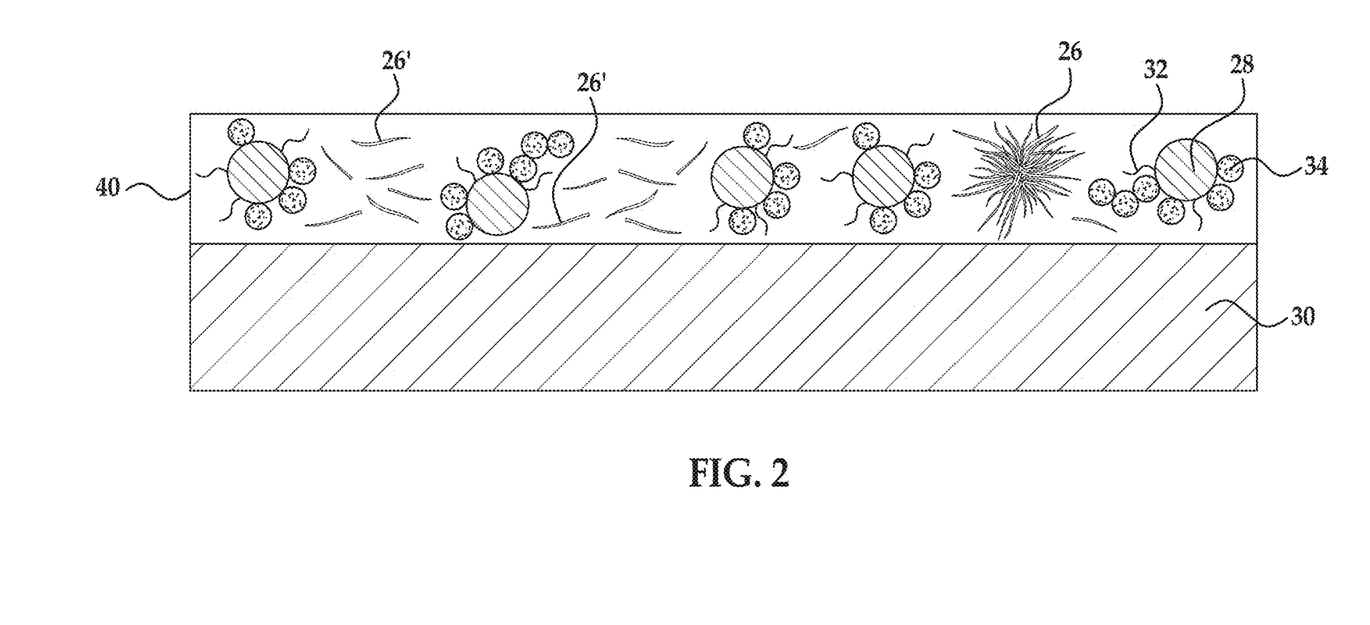
FIG. 2 is a cross-sectional view of an example of a positive electrode on a current collector.

An example of the method for preparing a positive electrode 40 of a lithium ion battery 300 (see FIG. 3) will now be discussed in reference to FIG. 2. FIG. 2 depicts an example of a positive electrode 40 including a lithium-based active material 28, a binder 32, a conductive filler 34, and the discrete aluminum oxide nanomaterials 26 as an additive, on a support 30.

In examples of preparing the positive electrode 40, the aluminum oxide nanomaterials 26 are dry mixed with the lithium-based active material 28 and the conductive filler 34. In some instances, the binder 32 is also dry mixed with the other components 26, 28, 34. A solvent may then be added. In other instances, the binder 32 and solvent are mixed together, and then added to the dry mixed components 26, 28, 34. As will be discussed in more detail below, the solvent may be deionized water or an organic solvent, depending on the binder 32 selected to form a dispersion or mixture.

Figure 3:
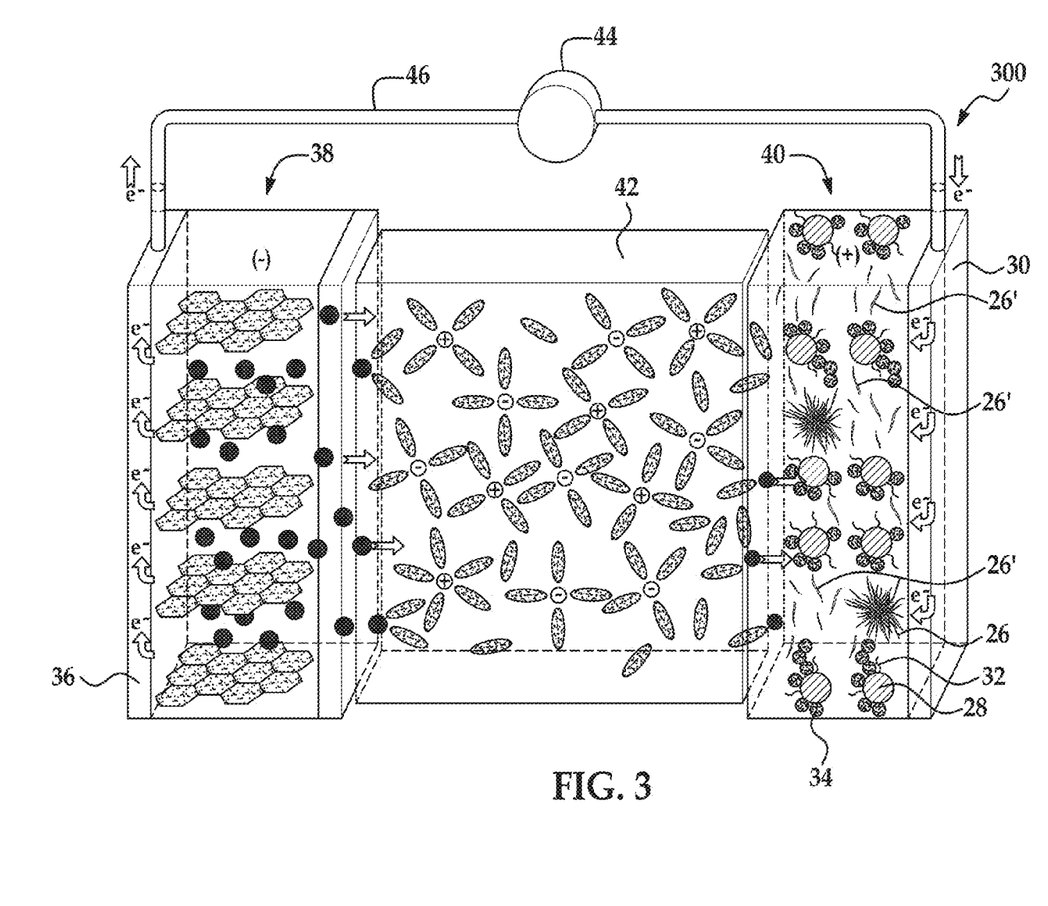
FIG. 3 is a perspective schematic view of an example of a lithium ion battery, including an example of the positive electrode disclosed herein.

The lithium-based active material 28 may include any lithium-based active material that can sufficiently undergo lithium insertion and deinsertion while aluminum or another suitable current collector 30 is functioning as the positive terminal of the lithium ion battery 300 (see FIG. 3). One common class of known lithium-based active materials suitable for this example of the positive electrode 40 includes layered lithium transition metal oxides. For example, the lithium-based active material 28 may be spinel lithium manganese oxide ($LiMn_2O_4$), lithium cobalt oxide ($LiCoO_2$), a manganese-nickel oxide spinel [$Li(Mn_{1.5}Ni_{0.5})O_2$], or a layered nickel-manganese-cobalt oxide (having a general formula of $xLi_2MnO_3 \cdot (1-x)LiMO_2$ or (M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}CO_{1/3})O_2$). Other suitable lithium-based active materials include $Li(Ni_{1/3}Mn_{1/3}CO_{1/3})O_2$, $Li_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$), or a lithium rich layer-structure. Still other lithium-based active materials may also be utilized, such as $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}CO_{0.15}Al_{0.05}O_2$ or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The lithium-based active material 28 of the positive electrode 40 may be intermingled with the binder 32, the conductive filler 34, and the aluminum oxide nanomaterials 26. The binder 32 structurally holds the lithium-based active materials 28 and the conductive filler 34 together. Some examples of suitable binders 32 include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Examples of the still other suitable binders include polyvinyl alcohol (PVA), sodium alginate, or other water-soluble binders.

The conductive filler 34 may be a conductive carbon material. The conductive carbon 34 may be a high surface area carbon, such as acetylene black or another carbon material (e.g., Super P). Other examples of suitable conductive fillers 34 include graphene, graphite, carbon nanotubes, and/or carbon nanofibers. The conductive filler 34 ensures electron conduction between the positive-side current collector 30 and the lithium-based active material 28 in the positive electrode 40.

As described above, the aluminum oxide nanomaterials 26 are nanostructures that extend radially and outward from the center so that they resemble a sea urchin. In addition to the aluminum oxide nanomaterials 26, the additive in the positive electrode 40 may also include nanomaterials 26' that have broken off of the sea urchin structure 26. The aluminum oxide nanomaterials 26 and the nanomaterials 26' are not embedded within or coated on the other positive electrode components. In some examples, the aluminum oxide nanomaterials 26 have a surface area of at least 150 m²/g. In an example, the aluminum oxide nanomaterials 26 are present in amount ranging from greater than 0 wt % to about 10 wt % based on a total wt % of the positive electrode 40.

In an example of the method for making the positive electrode 40, the aluminum oxide nanomaterials 26 are mixed with the binder 32, the conductive filler 34, and the lithium-based active material 28. All of these components may be manually mixed by dry-grinding. After all these components are ground together, the ground components are combined with water or organic solvent (depending on the binder 32 used) to form the dispersion/mixture. In an example, the solvent is a polar aprotic solvent. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof. When a water soluble binder, such as sodium alginate, is used, the solvent may be water.

The dispersion/mixture may be mixed by milling. Milling aids in transforming the dispersion/mixture into a coatable slurry. Low-shear milling or high-shear milling may be used to mix the dispersion/mixture. The dispersion/mixture milling time ranges from about 10 minutes to about 20 hours depending on the milling shear rate. In an example, a rotator mixer is used for about 20 minutes at about 2000 rpm to mill the dispersion/mixture.

In one example of the dispersion/mixture, the amount of the lithium-based active material 28 ranges from about 50 wt % to about 95 wt % (based on total solid wt % of the dispersion/mixture), the amount of the conductive filler 34 ranges from about 5 wt % to about 20 wt % (based on total solid wt % of the dispersion/mixture), the amount of the binder 32 ranges from about 5 wt % to about 20 wt % (based on total solid wt % of the dispersion/mixture), and the amount of the aluminum oxide nanomaterials 26 ranges from greater than 0 wt % up to about 10 wt % (based on the total solid wt % of the dispersion/mixture).

The slurry is then deposited onto the support 30. In an example, the support 30 is the positive-side current collector. It is to be understood that the support 30 may be formed from aluminum, or any other appropriate electrically conductive material known to skilled artisans. The support 30 that is selected should be capable of collecting and moving free electrons to and from an external circuit connected thereto.

The slurry may be deposited using any suitable technique. As examples, the slurry may be cast on the surface of the support 30, or may be spread on the surface of the support 30, or may be coated on the surface of the support 30 using a slot die coater.

The deposited slurry may be exposed to a drying process in order to remove any remaining solvent and/or water. Drying may be accomplished using any suitable technique. For example, the drying is conducted at ambient conditions (i.e., at room temperature, about 18° C. to 22° C., and 1 atmosphere). Drying may be performed at an elevated temperature ranging from about 60° C. to about 150° C. In some examples, vacuum may also be used to accelerate the drying process. As one example of the drying process, the deposited slurry may be exposed to vacuum at about 120° C. for about 12 to 24 hours.

The drying process results in the formation of the positive electrode 40. In an example, the thickness of the dried slurry (i.e., positive electrode 40) ranges from about 5 μm to about 200 μm. In another example, the thickness of the dried slurry (i.e., positive electrode 40) ranges from about 10 μm to about 100 μm.

During the formation of the positive electrode 40, the water and/or organic solvent(s) is/are removed, and thus the resulting positive electrode 40 includes from about 50 wt % to about 95 wt % (based on total wt % of the positive electrode 40) of the active material(s) 28, from about 5 wt % up to 20 wt % (based on total wt % of the positive electrode 40) of the conductive filler 34, from about 5 wt % up to 20 wt % (based on total wt % of the positive electrode 40) of the binder 32, and from greater than 0 wt % up to about 10 wt % (based on the total wt % of the positive electrode 40) of the aluminum oxide nanomaterials 26.

Referring now to FIG. 3, the lithium ion battery 300 is depicted. The lithium ion battery 300 shown in FIG. 3 includes the positive electrode 40 with the discrete aluminum oxide nanomaterials 26 as the additive.

As shown in FIG. 3, the lithium ion battery 300 includes, in addition to the positive electrode 40 and the positive side current collector 30, a negative electrode 38, a negative-side current collector 36, and a porous separator 42 positioned between the positive electrode 40 and the negative electrode 38.

In FIG. 3, the positive electrode 40 may be formed from any suitable lithium-based active material 28 as previously described in reference to FIG. 2. As mentioned above, the lithium based-based active material 28 may be intermingled with the binder 32, the conductive filler 34, and the discrete aluminum oxide nanomaterials 26.

The positive-side current collector 30 may be formed from aluminum or any other appropriate electrically conductive material known to skilled artisans.

The porous separator 42 in FIG. 3, which operates as both an electrical insulator and a mechanical support, is sandwiched between the negative electrode 38 and the positive electrode 40 to prevent physical contact between the two electrodes 38, 40 and the occurrence of a short circuit. In addition to providing a physical barrier between the two electrodes 38, 40, the porous separator 42 ensures passage of lithium ions (identified by the black dots and by the open circles having a (+) charge in FIG. 3) and related anions (identified by the open circles having a (−) charge in FIG. 3) through an electrolyte solution filling its pores. This helps ensure that the lithium ion battery 300 functions properly.

The porous separator 42 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator 42 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator 42 may be chosen from a combination of the polyolefin (such as PE and/or PP) and one or more of the polymers listed above.

The porous separator 42 may contain a single layer or a multi-layer laminate fabricated from either a dry or wet process. For example, a single layer of the polyolefin and/or other listed polymer may constitute the entirety of the porous separator 42. As another example, however, multiple discrete layers of similar or dissimilar polyolefins and/or polymers may be assembled into the porous separator 42. In one example, a discrete layer of one or more of the polymers may be coated on a discrete layer of the polyolefin to form the porous separator 42. Further, the polyolefin (and/or other polymer) layer, and any other optional polymer layers, may further be included in the porous separator 42 as a fibrous layer to help provide the porous separator 42 with appropriate structural and porosity characteristics. Still other suitable porous separators 42 include those that have a ceramic layer attached thereto, and those that have ceramic filler in the polymer matrix (i.e., an organic-inorganic composite matrix).

Any appropriate electrolyte solution that can conduct lithium ions between the negative electrode 38 and the positive electrode 40 may be used in the lithium ion battery 300. In one example, the electrolyte solution may be a non-aqueous liquid electrolyte solution that includes a lithium salt dissolved in an organic solvent or a mixture of organic solvents. Skilled artisans are aware of the many non-aqueous liquid electrolyte solutions that may be employed in the lithium ion battery 300 as well as how to manufacture or commercially acquire them. Examples of lithium salts that may be dissolved in an organic solvent to form the non-aqueous liquid electrolyte solution include $LiClO_4$, $LiAlCl_4$, LiI, LiBr, LiSCN, $LiBF_4$, $LiB(C_6H_5)_4$, $LiCF_3SO_3$, $LiN(FSO_2)_2$ (LIFSI), $LiN(CF_3SO_2)_2$ (LITFSI), $LiAsF_6$, $LiPF_6$, $LiB(C_2O_4)_2$ (LiBOB), $LiBF_2(C_2O_4)$ (LiODFB), $LiPF_4(C_2O_4)$ (LiFOP), $LiNO_3$, and mixtures thereof. These and other similar lithium salts may be dissolved in a variety of organic solvents, such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran,1,3-dioxolane), and mixtures thereof As shown in FIG. 3, the lithium ion battery 300 also includes an interruptible external circuit 46 that connects the negative electrode 38 and the positive electrode 40. The lithium ion battery 300 may also support a load device 44 that can be operatively connected to the external circuit 46. The load device 44 receives a feed of electrical energy from the electric current passing through the external circuit 46 when the lithium ion battery 300 is discharging. While the load device 44 may be any number of known electrically-powered devices, a few specific examples of a power-consuming load device 44 include an electric motor for a hybrid vehicle or an all-electrical vehicle, a laptop computer, a cellular phone, and a cordless power tool. The load device 44 may also, however, be an electrical power-generating apparatus that charges the lithium ion battery 300 for purposes of storing energy. For instance, the tendency of windmills and solar panels to variably and/or intermittently generate electricity often results in a need to store surplus energy for later use.

The lithium ion battery 300 may also include a wide range of other components that, while not depicted here, are nonetheless known to skilled artisans. For instance, the lithium ion battery 300 may include a casing, gaskets, terminals, tabs, and any other desirable components or materials that may be situated between or around the negative electrode 38 and the positive electrode 40 for performance-related or other practical purposes. Moreover, the size and shape of the lithium ion battery 300, as well as the design and chemical make-up of its main components, may vary depending on the particular application for which it is designed. Battery-powered automobiles and hand-held consumer electronic devices, for example, are two instances where the lithium ion battery 300 would most likely be designed to different size, capacity, and power-output specifications. The lithium ion battery 300 may also be connected in series and/or in parallel with other similar lithium ion batteries to produce a greater voltage output and current (if arranged in parallel) or voltage (if arranged in series) if the load device 44 so requires.

The lithium ion battery 300 generally operates by reversibly passing lithium ions between the negative electrode 38 and the positive electrode 40. In the fully charged state, the voltage of the battery 400 is at a maximum (typically in the range 2.0V to 5.0V); while in the fully discharged state, the voltage of the battery 300 is at a minimum (typically in the range 0V to 2.0V). Essentially, the Fermi energy levels of the active materials in the positive and negative electrodes 40, 38 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 44 enables an electronic current flow in the external circuit 46 with a direction such that the difference between the Fermi levels (and, correspondingly, the cell voltage) decreases. The reverse happens during battery charging: the battery charger forces an electronic current flow in the external circuit 46 with a direction such that the difference between the Fermi levels (and, correspondingly, the cell voltage) increases.

At the beginning of a discharge, the negative electrode 38 of the lithium ion battery 300 contains a high concentration of intercalated lithium while the positive electrode 40 is relatively depleted. When the negative electrode 38 contains a sufficiently higher relative quantity of intercalated lithium, the lithium ion battery 300 can generate a beneficial electric current by way of reversible electrochemical reactions that occur when the external circuit 46 is closed to connect the negative electrode 38 and the positive electrode 40. The establishment of the closed external circuit 46 under such circumstances causes the extraction of intercalated lithium from the negative electrode 38. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 40 and the negative electrode 38 (ranging from about 2.0V to about 5.0V, depending on the exact chemical make-up of the electrodes 38, 40) drives the electrons ($e^-$) produced by the oxidation of intercalated lithium at the negative electrode 38 through the external circuit 46 towards the positive electrode 40. The lithium ions are concurrently carried by the electrolyte solution through the porous separator 42 towards the positive electrode 40. The electrons ($e^-$) flowing through the external circuit 46 and the lithium ions migrating across the porous separator 42 in the electrolyte solution eventually reconcile and form intercalated lithium at the positive electrode 40. The electric current passing through the external circuit 46 can be harnessed and directed through the load device 44 until the level of intercalated lithium in the negative electrode 38 falls below a workable level or the need for electrical energy ceases.

The lithium ion battery 300 may be recharged after a partial or full discharge of its available capacity. To charge the lithium ion battery 300 an external battery charger is connected to the positive and the negative electrodes 40, 38, to drive the reverse of battery discharge electrochemical reactions. During recharging, the electrons ($e^-$) flow back towards the negative electrode 38 through the external circuit 46, and the lithium ions are carried by the electrolyte across the porous separator 42 back towards the negative electrode 38. The electrons ($e^-$) and the lithium ions are reunited at the negative electrode 38, thus replenishing it with intercalated lithium for consumption during the next battery discharge cycle.

The external battery charger that may be used to charge the lithium ion battery 300 may vary depending on the size, construction, and particular end-use of the lithium ion battery 300. Some suitable external battery chargers include a battery charger plugged into an AC wall outlet and a motor vehicle alternator.

The large surface area (e.g., at least 150 $m^2/g$) and unique structure (e.g., having a plurality nanostructures extending radially and outward from a hollow center, each nanostructure having a diameter ranging from about 10 nm to about 200 nm and a length of about 80 nm to about 3 microns) of the aluminum oxide nanomaterials 26 render them suitable for use in a variety of additional applications. In an example, the aluminum oxide nanomaterials 26 may be used in water purification. The aluminum oxide nanomaterials 26 may remove ions (e.g., lead (II) and mercury (II)) from water. The large surface area and unique structure of the aluminum oxide nanomaterials 26 may provide a greater number of absorption sites for the removal of the ions from the water. In another example, the aluminum oxide nanomaterials 26 may also be suitable for use as a supporting material in drug delivery.

To further illustrate the present disclosure, examples are given herein. It is to be understood that these examples are provided for illustrative purposes and are not to be construed as limiting the scope of the disclosure.

EXAMPLES

Example 1

Six samples of aluminum oxide nanomaterials were prepared. Samples 1-4 were prepared according to a comparative method. Sample 5 and 6 were prepared according to an example of the method disclosed herein.

Sample 1 was prepared by adding 5.4 grams of $AlCl_3$ powder (i.e., 12 grams of $AlCl_3.9H_2O$) and 1 M HCl to deionized water. The $AlCl_3$ powder was dissolved in deionized water. 1M NaOH, which served as the pH adjuster, was added to the solution dropwise until a white precipitate formed and the desired pH was reached. The pH of this mixture was about 11. The mixture was introduced into a TEFLON®-lined stainless steel autoclave. The processing parameters for hydrothermal synthesis included exposing the aqueous mixture to a temperature of 200° C. for about a 24 to 48 hour period. It is believed that the pressure in the autoclave was about 1400 psi during hydrothermal synthesis. At the end of the hydrothermal synthesis, the reaction product was removed from the autoclave, washed with deionized water, vacuum filtered, and dried in a vacuum at about 80° C. for about 12 to about 24 hours.

The reaction product, which included nanotubes, was exposed to annealing at 550° C. for about 5 hours in air. During the heat treatment, the nanotubes sintered to form nanorods, and water was generated as a byproduct and vaporized, forming three-dimensional interconnected pores in the nanorods. The reaction during annealing was likely: $\gamma\text{-AlOOH} \rightarrow \gamma\text{-Al}_2\text{O}_3 + \text{H}_2\text{O}\uparrow$. The porous $\gamma\text{-Al}_2\text{O}_3$ nanorods prepared in sample 1 had an average surface area of about 120 $m^2/g$.

Sample 2 was prepared according to the same method according to which sample 1 was prepared with the following variation. After the pH adjuster was added to the mixture, the pH was about 9. The porous $\gamma\text{-Al}_2\text{O}_3$ nanorods prepared in sample 2 had an average surface area of about 130 $m^2/g$.

Sample 3 was prepared according to the same method according to which sample 1 was prepared with the following variation. After the pH adjuster was added to the mixture, the pH was about 5. The porous $\gamma\text{-Al}_2\text{O}_3$ nanorods prepared in sample 3 had an average surface area of about 140 $m^2/g$.

Sample 4 was prepared according to the same method according to which sample 1 was prepared with the following variation. $\text{Al(O-i-Pr)}_3$ was used as the precursor instead of $\text{AlCl}_3$. The pH of this mixture was about 11. The porous $\gamma\text{-Al}_2\text{O}_3$ nanorods prepared in sample 4 had an average surface area of about 120 $m^2/g$. Samples 1 through 4 illustrate that the $\text{AlCl}_3$ powder and the $\text{Al(O-i-Pr)}_3$ are quite similar in terms of the surface area of the final $\gamma\text{-Al}_2\text{O}_3$ nanorods that are formed.

Figure 7:
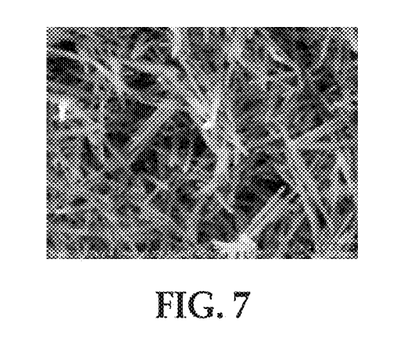
FIG. 7 is a SEM image, using a scalar bar of 300 nm, of examples of aluminum oxide nanorods formed from a comparative method.

A TEM image was taken of the porous $\gamma\text{-Al}_2\text{O}_3$ nanorods prepared in sample 1. This is shown in FIG. 7, which clearly illustrates the one-dimensional dimensions.

Sample 5 was prepared according to an example of the method disclosed herein. An aqueous mixture was prepared by adding 12 g of $\text{AlCl}_3$, 1M HCl, and 10-30 mg of hollow carbon to 60 mL of deionized water. The aqueous mixture had a pH of 1.5.

The aqueous mixture was introduced into a TEFLON®-lined stainless steel autoclave. The processing parameters for hydrothermal synthesis included exposing the aqueous mixture to a temperature of 200° C. for about a 24 to 36 hour period. It is believed that the pressure in the autoclave was about 1400 psi during hydrothermal synthesis. At the end of the hydrothermal synthesis, the reaction product was removed from the autoclave.

After the hydrothermal synthesis, the reaction product was filtered, washed, and dried to obtain the precursor nanostructure. The precursor nanostructure included the AlOOH petals/spikes assembled together on the hollow carbon composite as a sea urchin-like nanostructure, where each AlOOH petal had an average length ranging from 80 nm to about 3 µm, and an average diameter ranging from about 20 nm to about 200 nm.

The sea urchin-like nanostructures with the hollow carbon composites were then exposed to annealing at 550° C. for about 5 hours in air. During the heat treatment, the hollow carbon composites were burned off and the nanostructures sintered to form aluminum oxide nanomaterials with the sea urchin-like structure, and water was generated as a byproduct and vaporized. The reaction during annealing was likely: $2\gamma\text{-AlOOH} \rightarrow \gamma\text{-Al}_2\text{O}_3 + \text{H}_2\text{O}\uparrow$. The aluminum oxide nanomaterials prepared in sample 5 had an average surface area of about 240 $m^2/g$.

Sample 6 was prepared according to the same method according to which sample 5 was prepared with the following variation. Graphite was used as the carbon material. The aluminum oxide nanomaterials prepared in sample 6 had an average surface area of about 195 $m^2/g$.

In comparing samples 5 and 6, the hollow carbon resulted in a higher surface area nanomaterial and was more easily burned off during post hydrothermal treatment. However, it is noted that the nanomaterial formed using graphite had a higher surface area than any of samples 1-4.

Figure 6:
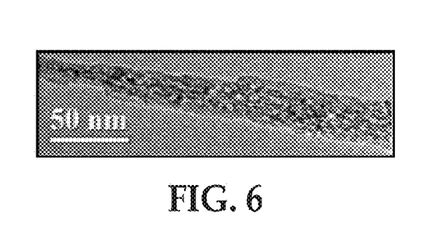
FIG. 6 is a TEM image, using a scalar bar of 50 nm, of an example of one of the nanostructures that extend radially and outward from the center of an aluminum oxide nanomaterial.
Figure 8:
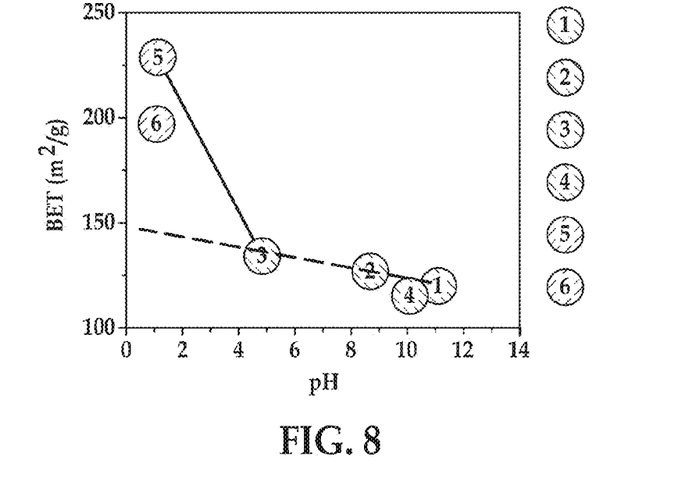
FIG. 8 is a graph exhibiting surface area ($m^2/g$, left Y axis) versus the potential Hydrogen (pH) value (X axis) for examples of aluminum oxide nanorods formed from the comparative method and for examples of the aluminum oxide nanomaterials formed from an example of the method disclosed herein.

A SEM image was taken of the aluminum oxide nanomaterials prepared in sample 5. This is shown in FIG. 4. A TEM image was also taken of the aluminum oxide nanomaterials prepared in sample 5. This is shown in FIG. 5. FIGS. 4 and 5 clearly illustrate the sea urchin-like structure of the aluminum oxide nanomaterials. A TEM image was taken of one of the nanostructures that extend radially and outward from the center of an aluminum oxide nanomaterial. This is shown in FIG. 6, which clearly shows how each nanostructure may decrease in diameter along the length of the nanostructure away from the center. FIG. 8 is a graph showing the surface area ($m^2/g$, left Y axis) versus the pH value for samples 1-6.

Example 2

The aluminum oxide nanomaterials of sample 5 were incorporated as an additive into two example positive electrodes (A, A'). The example positive electrodes included about 78% of a $\text{Li(Li}_{0.2}\text{Mn}_{0.54}\text{Ni}_{0.13}\text{Co}_{0.13})\text{O}_2$ material as the active material, about 10% of a binder (PVdF), about 10% of a conductive filler (carbon black), and about 2 wt % of the aluminum oxide nanomaterials. After mixing, most of the nanostructures extending radially and outward from the center were broken off of the aluminum oxide nanomaterials. The broken off nanostructures were laid down laterally and dispersed substantially uniformly in the electrode.

A comparative positive electrode (B) included all of the same components as the example positive electrode except for the aluminum oxide nanomaterials. The comparative positive electrode included no aluminum oxide nanomaterials.

To form the positive example electrodes, the $\text{Li(Li}_{0.2}\text{Mn}_{0.54}\text{Ni}_{0.13}\text{Co}_{0.13})\text{O}_2$ active material, the carbon black, and the aluminum oxide nanomaterials were dry mixed in a THINKY® mixer. The PVdF and a solvent (NMP) were added to the dry mixture. To form the comparative electrode, the $\text{Li(Li}_{0.2}\text{Mn}_{0.54}\text{Ni}_{0.13}\text{Co}_{0.13})\text{O}_2$ active material and the carbon black were dry mixed in a THINKY® mixer. The PVdF and a solvent (NMP) were added to the dry mixture. The mixtures were mixed with until two relatively uniform, coatable slurries were formed. The slurries were casted onto respective aluminum current collectors. The electrode coating and comparative electrode coating were dried at room temperature in air, then dried in an oven at about 80° C. for about 24 hours, and then dried in vacuum at about 100° C. for about 24 hours.

Each of the comparative positive electrode and the example positive electrodes was used with a lithium foil negative electrode to construct half cells. Coin cells (2032 hardware) were assembled inside an Ar-filled glovebox. Microporous tri-layered polypropylene (PP) and polyethylene (PE) polymer membranes (CELGARD 2032, available from Celgard) was used as the separator. The electrolyte consisted of 1M LiPF6 in a mixture of solvents, such as ethylene carbonate (EC) and diethyl carbonate (DEC) at a volume ratio of 1:2.

The coin cells were held at 45° C. to perform galvanostatical cycling tests. The cycling tests were carried out at a rate of C/3 and were cycled within the voltage window of 2.0V to 4.6V for at least 100 cycles.

Figure 9:
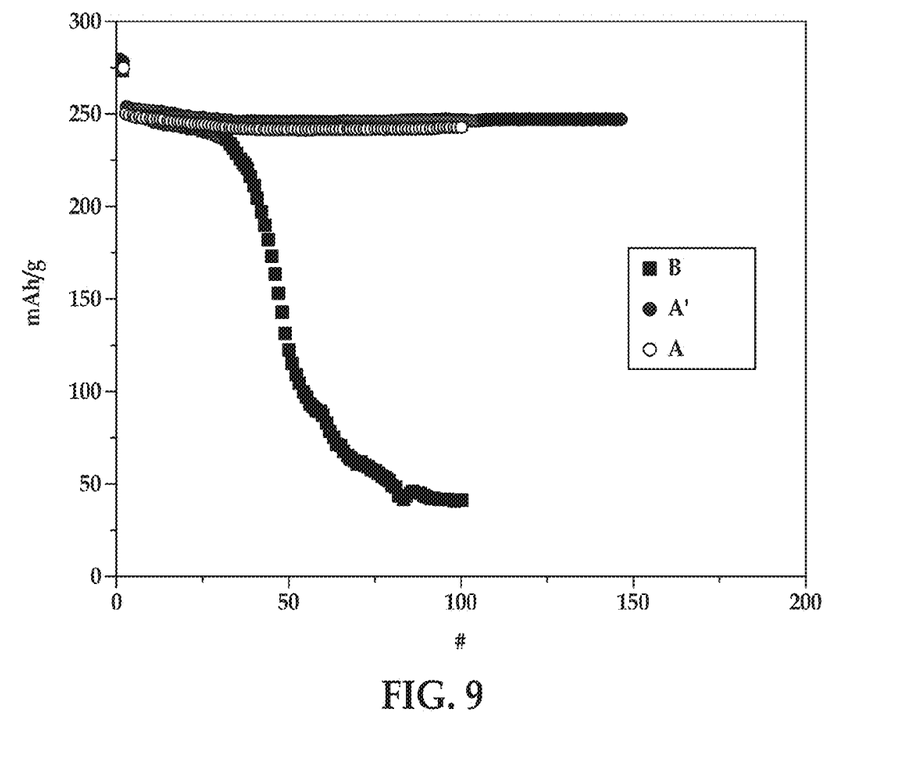
FIG. 9 is a graph exhibiting the discharge capacity (mAh/g, left Y axis) versus the cycle number (X axis) for an example coin cell including a positive electrode with discrete aluminum oxide nanomaterials as an additive.

FIG. 9 depicts the discharge capacity (mAh/g, Y axis) versus the cycle number (X axis) for the coin cells including the comparative example positive electrode (B) and the example positive electrodes (A, A') with the aluminum oxide nanomaterial additives. The discharge capacity (solid circles, A', and hollow circles, A) of the example positive electrodes is much greater compared to the discharge capacity (solid squares, B) of the comparative example positive electrode as the cycle number is increased to 30 or more.

As illustrated in FIG. 9, the cycling stability during discharging improved when the positive electrode included the aluminum oxide nanomaterials disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from greater than 0 wt % up to about 10 wt % should be interpreted to include not only the explicitly recited limits of from greater than 0 wt % up to about 10 wt %, but also to include individual values, such as 3.5 wt %, 6 wt %, 2 wt %, etc., and sub-ranges, such as from about 0.5 wt % to about 8 wt %, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A positive electrode, comprising:
a lithium-based active material;
a binder;
a conductive filler; and
additives for scavenging hydrofluoric acid (HF) within the positive electrode, the additives comprising:
discrete aluminum oxide nanomaterials comprising nanostructures extending radially and outward from a center and having a surface area of at least 150 m$^2$/g; and
discrete aluminum oxide nanostructures, wherein the discrete aluminum oxide nanomaterials and discrete aluminum oxide nanostructures each comprise a plurality of absorbing sites that absorb the hydrofluoric acid (HF) and are substantially uniformly mixed throughout the positive electrode, with the lithium-based active material, the binder, and the conductive filler.

2. The positive electrode as defined in claim 1 wherein the aluminum oxide nanomaterials are present in amount ranging from greater than 0 wt % to about 10 wt % based on a total wt % of the positive electrode.

3. The positive electrode as defined in claim 1 wherein:
the lithium-based active material is present in an amount ranging from about 50 wt % to about 95 wt % based on a total wt % of the positive electrode;
the binder is present in an amount ranging from about 5 wt % to about 20 wt % based on the total wt % of the positive electrode;
the conductive filler is present in an amount ranging from about 5 wt % to about 20 wt % based on the total wt % of the positive electrode; and
the aluminum oxide nanomaterials are present in an amount ranging from greater than 0 wt % up to about 10 wt % based on the total wt % of the positive electrode.

4. The positive electrode as defined in claim 1 wherein the nanostructures are connected to one another at or near the center.

5. The positive electrode as defined in claim 1 wherein at least a portion of the discrete aluminum oxide nanostructures are laterally disposed throughout the positive electrode.

6. A lithium-based battery, comprising:
a positive electrode, including:
a lithium-based active material;
a binder;
a conductive filler;
discrete aluminum oxide nanomaterials; and
discrete aluminum oxide nanostructures, wherein the discrete aluminum oxide nanomaterials and discrete aluminum oxide nanostructures are substantially uniformly mixed throughout the positive electrode as an additive for scavenging hydrofluoric acid (HF) within the positive electrode with the lithium-based active material, the binder, and the conductive filler, wherein the discrete aluminum oxide nanomaterials include nanostructures extending radially and outward from a center and having a surface area of at least 150 m$^2$/g, and wherein the discrete aluminum oxide nanomaterials and the discrete aluminum oxide nanostructures each comprise a plurality of absorbing sites that absorb the hydrofluoric acid (HF),
a negative electrode,
a solid-electrolyte interphase (SEI) on a surface of the negative electrode that mitigates transition metal dissolution within the lithium-based battery; and
a microporous polymer separator soaked in an electrolyte solution, the microporous polymer separator being disposed between the positive electrode and the negative electrode.

7. The lithium-based battery as defined in claim 6 wherein the aluminum oxide nanomaterials are present in amount ranging from greater than 0 wt % to about 10 wt % based on a total wt % of the positive electrode.

8. The lithium-based battery as defined in claim 6 wherein the nanostructures are connected to one another at or near the center.

9. A method, comprising:
forming a solution by mixing an aluminum oxide precursor and an acid;
adding a carbon material to the solution, thereby forming an aqueous mixture having the carbon material therein;
performing hydrothermal synthesis using the aqueous mixture, thereby growing precursor nanostructures on the carbon material; and
annealing the precursor nanostructures on the carbon material, thereby removing the carbon material to form aluminum oxide nanomaterials and discrete aluminum oxide nanostructures, wherein the aluminum oxide nanomaterials and discrete aluminum oxide nanostructures are substantially uniformly mixed throughout a positive electrode, as additives for scavenging hydrofluoric acid (HF) within the positive electrode, wherein the discrete aluminum oxide nanomaterials and discrete aluminum oxide nanostructures each comprise a plurality of absorbing sites that absorb the hydrofluoric acid (HF), wherein the aluminum oxide nanomaterials include nanostructures extending radially and outward from a center and have a surface area of at least 150 $m^2/g$.

10. The method as defined in claim 9 wherein the aluminum oxide precursor is $AlCl_3$ or $Al(O\text{-}i\text{-}Pr)_3$.

11. The method as defined in claim 9 wherein the solution has a potential hydrogen (pH) value ranging from about 1 to about 3.

12. The method as defined in claim 9 wherein the hydrothermal synthesis includes subjecting the aqueous mixture to heat and vapor pressure in a closed system, thereby causing growth of the precursor nanostructures radially and outward from the carbon material.

13. The method as defined in claim 9, further comprising:
removing the precursor nanostructures and any liquid present after the hydrothermal synthesis from a closed system prior to the annealing of the precursor nanostructures;
wherein the annealing of the precursor nanostructures occurs by applying a heat treatment in an oxygen-containing environment at a temperature ranging from about 400° C. to about 800° C. for a time ranging from about 3 hours to about 8 hours, thereby forming the aluminum oxide nanomaterials.

14. The method as defined in claim 9 wherein the carbon material is hollow carbon or graphite.

15. The method as defined in claim 9 wherein the method further comprises breaking off at least some nanostructures extending radially and outward from the center.

16. The method as defined in claim 9, further comprising:
dry mixing the aluminum oxide nanomaterials into a mixture, the mixture including a lithium-based active material and a conductive filler;
adding a binder and a solvent to the mixture;
mixing the mixture to form a slurry;
depositing the slurry onto a support; and
drying the slurry to form the positive electrode.

* * * * *